2 Sheets—Sheet 1.
S. R. PARKHURST.
Cotton Gin.
No. 1,137.
Reissued Feb. 12, 1861.
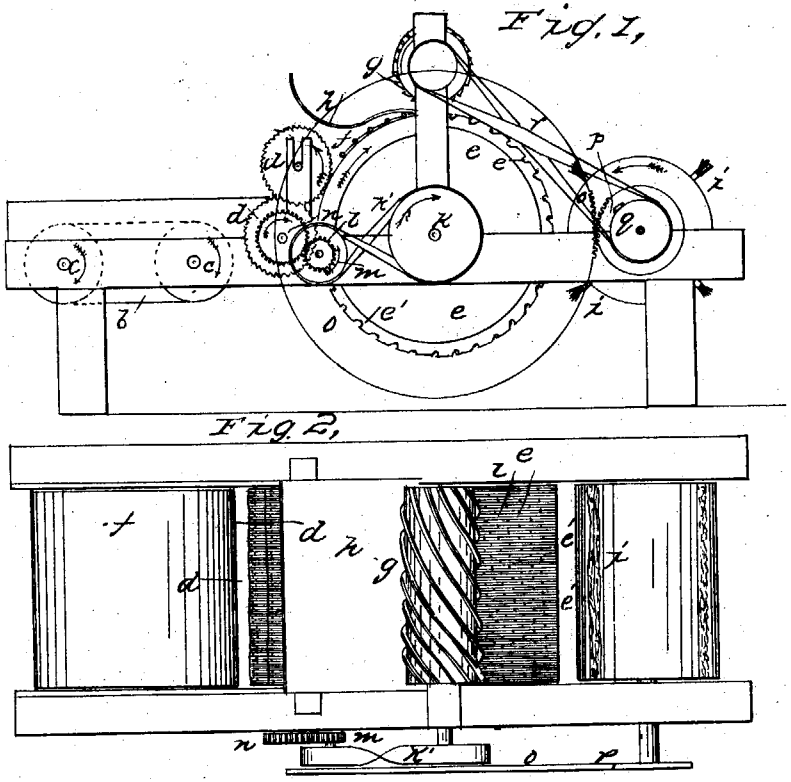
Witnesses:
M. B. Mudes
Melvill T. Biggs
Inventor:
S. R. Parkhurst.
N. PETERS, Photo-Lithographer, Washington, D. C.

2 Sheets—Sheet 2.
S. R. PARKHURST.
Cotton Gin.
No. 1,137. Reissued Feb. 12, 1861.
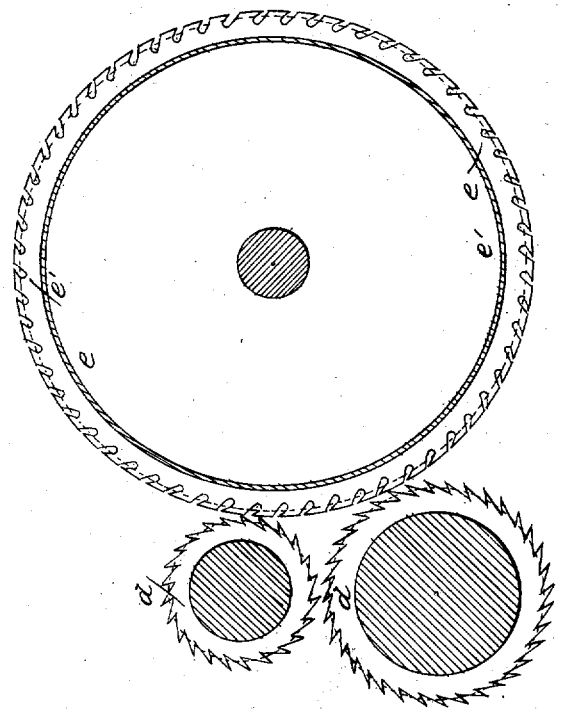
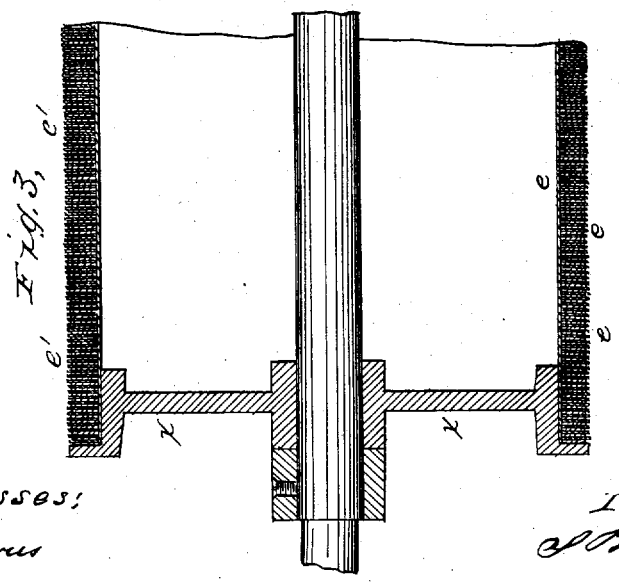
Witnesses:
Melville V Briggs
Mizaudebus
Inventor:
S R Parkhurst
N. PETERS, Photo-Lithographer, Washington, D. C.

UNITED STATES PATENT OFFICE.

STEPHEN R. PARKHURST, OF WEST BROOMFIELD, NEW JERSEY.

IMPROVEMENT IN MACHINES FOR GINNING COTTON AND BURRING WOOL.

Specification forming part of Letters Patent No. 4,023, dated May 1, 1845; extended 7 years; Reissue No. 1,137, dated February 12, 1861.

*To all whom it may concern:*

Be it known that I, STEPHEN R. PARKHURST, formerly of Paterson, Passaic county, in the State of New Jersey, and at present residing in the town of West Broomfield, county of Essex, in the same State, have invented certain new and improved apparatus for separating wool, cotton, and other fibrous material from burrs, seeds, dirt, and foreign matter of various kinds which may be intermingled with the fiber, and the combination of parts of said apparatus with a common carding-machine, whereby the cleansing of the wool and the carding it may be done at the same time and by one continuous operation.

My invention is fully and clearly set forth in the following description and the drawings making part thereof.

In the drawings, Figure 1 is a side elevation of my apparatus. Fig. 2 is a plan thereof. Fig. 3 is a vertical section of a portion of a full-sized burring or ginning cylinder in a plane coincident with its axis; and Fig. 4 is also a vertical section through the same in a plane perpendicular to the axis and through the feeding-rollers.

The apparatus consists of an ordinary feeding-apron, such as *b*, being in the present instance a belt surrounding two rollers, *c c*; of a pair of feeding-rollers, *d d*, the upper one of which is mounted, so as to be free to rise and fall, and both of which are to be clothed with proper teeth; of a main cylinder, *e e*, of peculiar construction, and of a rotating beater, *g*; and to these are to be added a box or receptacle, *h*, for the deposit of burrs, seed, and other trash, and also a rotating brush, *i*, and I sometimes intend to dispense with this brush when the apparatus is employed in combination with a carding-machine. The feed-apron may be caused to move in any convenient manner, so as to carry fibrous material intermingled with impurities to the feeding-rollers. The main or ginning or burring cylinder may receive motion in the direction of the arrow at the rate of from one hundred and twenty-five to one hundred and seventy-five revolutions per minute on wool, and from two hundred to two hundred and fifty revolutions on cotton per minute, or thereabout, from any proper source of power, and may, by means of a pulley, *k*, and a belt, *k'*, drive another pulley, *l*, mounted on the same shaft with a cog-wheel, *m*, which engages with another cog-wheel, *n*, keyed on the shaft of the lower feeding-roller. The lower feeding-roller will thus be moved at such a rate of speed that any points on its surface will move much slower than any point on the surface of the main cylinder, and the upper feeding-roller being driven by friction, as it rests upon the lower one, will move at about the same speed. A large cog-wheel, like *o o*, may be keyed upon the shaft of the main cylinder, outside of the pulley *k*. This wheel is indicated by a red line, and its teeth, which are to continue all around its circumference, engage with the teeth of another cog-wheel, *p*, mounted on the shaft of a rotating brush, *i*. This same shaft carries a pulley, *q*, which, through the intervention of a strap or endless belt, *r*, gives rotary motion to another pulley keyed upon the shaft of a rotating beater, *g*. The brush-cylinder will thus revolve much faster than the main cylinder, and the rotating beater will rotate about as fast as the brush. The belt must approach the feeding-rollers sufficiently close to deliver fibrous material to their grasp. The feeding-rollers must approach the main cylinder so nearly that the teeth of the latter will engage fibers protruded by the former, the wings on the revolving beater must nearly touch the tops of the teeth of the main cylinder, and the brushes as they rotate must enter in among the teeth of the main cylinder, so as to remove the cleansed fiber. The beater should run in the direction of the arrow thereon, so that its wings shall knock and blow off extraneous matter from the main cylinder in a direction from the points to the backs of the teeth thereon, while the brush-cylinder should revolve in the direction of the arrow upon it, so as to sweep out the cleansed fiber in a direction from the backs to the points of the teeth on the main cylinder. All the shafts may be supported in any proper way and moved by any appropriate gearing or belting so long as the various parts are in the relative positions, substantially as described, and are made to revolve with relative speeds and in the proper directions to perform the work, substantially in the manner set forth. The feeding-rollers may be clothed with card-teeth or any other kind of hooked or pointed teeth that will seize the fibers and carry them forward, while they at the same time retain a hold upon the fibers in such manner as in a measure to resist their being drawn away by the teeth of the main cylinder, and I prefer to make the teeth of each roller hook over in the same direction, as shown in the drawings, the object being that the acting teeth on the lower roller shall retain the fiber in opposition to the drag or pull of the main cylinder.

The main cylinder is constructed in a peculiar and novel manner with the object of securing both rigidity and lightness and affording teeth sufficiently strong to do the work, and not liable to wear out, while at the same time it is not expensive. I prefer to make this cylinder upon a sheet-metal foundation or hollow cylinder of tin like a strong tin pipe supported in some proper manner upon a shaft, and upon this cylinder I pack steel rings, such as are shown in the drawings at *e' e'*, each ring being notched or cut out from the periphery inward, substantially as shown in Figs. 1, 3, and 4, so as to form a series of flat teeth, and between each ring there is to be interposed a ring of pasteboard, or other proper material equivalent for the purpose, these pasteboard rings not projecting so far outward as the steel rings, and their office being twofold—viz., first, to space and separate the steel rings, and, second, to present a cylindrical surface, which prevents fibers from being drawn too far down toward the center of the cylinder between the steel rings. These alternate smoothed and toothed rings are to be forced into close proximity, so as to constitute an exterior acting surface to the cylinder. The teeth formed on the periphery of the steel rings have tops concentric with the center of the cylinder, and the point of each tooth is protected by the back and top of the one preceding it in a manner and for purposes well known to makers of cotton-gins and burring-machines. Each tooth, moreover, by itself is a flat piece of metal, whose sides are parallel, or nearly so, with circles surrounding the cylinder, and united by a metallic connection with its neighbors, and I prefer to arrange the points in such a manner that each point shall be opposite the flat sides of the teeth to the right and left of it. It is, moreover, necessary that the periphery of the smooth rings shall extend outward so near to the tops of the teeth that burrs and cotton-seed shall not be able to rest so far below the tops of the teeth as to escape the action of the revolving beater. The alternate smooth and toothed rings are to be held from slipping lengthwise of the cylinder by metallic heads properly secured, as shown at *x*, or in any other suitable manner. The cylinder thus constructed as a whole is hollow, and therefore light, is strong and rigid, is not liable to get out of truth, and may be revolved with great rapidity, while its surface as a whole is made up of strong, long-topped, and comparatively thin concentric teeth projecting from a cylindrical surface, with their sides parallel, or nearly so, to the ends of the cylinder. All the parts of which it is composed are, moreover, in intimate union, which cannot be disturbed by any ordinary use of the machine. Its operation will be hereinafter described, and its efficiency depends upon its lightness and strength, which results from its being hollow, and the construction of the acting parts of its surface, so as to produce the results hereinafter specified by the use of strong flat concentric protected teeth, whose sides are in substantial accordance with planes perpendicular to the axis of the cylinder, alternating with or substantially projecting from a cylindrical surface, such efficiency being independent of the precise manner in which the various parts that compose it are mechanically constructed and put together.

The beater or blower which knocks off the burrs or seed is a cylinder having projecting from its surface strips or wings of sheet metal, each of which is a spiral. It is to be arranged with respect to the main cylinder as above described; and as the outer edges of the wings are the parts that do the work, it may be constructed in any desired manner, so long as it possesses rapidly-revolving edges or blades running in close proximity to the tops of the teeth on the main cylinder. The acting parts of the brush-cylinder are the projecting bristles or their equivalents sweeping among the teeth of the main cylinder in a direction from their heels to their points, and it may be made in any way so long as it has brushes operating as described.

The receptacle for burrs, trash, &c., is represented in the drawings as made of a curved plate of metal. Its office is to receive burrs, seed, and trash as they are knocked into it by the rotating beater, preventing them from falling onto the feed-rollers or the apron, or from being thrown about the apartment in which the machine is used, and its construction and location are immaterial so long as it is in proper position to receive the trash, burrs, seed, dirt, &c., and is so formed as to hold what is thrown into it by the machine when in operation. When the burring-cylinder is combined with a carding-machine, one of the card-clothed cylinders of the latter is to occupy the position of the brush-cylinder or revolving brush, and is to serve the same purpose—viz., to strip the fiber off of the main cylinder after it has been separated from burrs and trash. The surface of the cylinder that is clothed with card-teeth must therefore run in the same direction as that part of the burring-cylinder from which it strips the cleansed fiber, and the card-teeth must engage sufficiently with the main cylinder-teeth to remove fiber from them. When the burring-cylinder and its beater are so used in combination with a carding-engine, taking the place of the tumblers usually employed with a carding-machine, the operations of cleansing and carding wool will be carried on continuously and jointly, and the card-teeth will last longer and the carded wool be in a better state to undergo the subsequent operations to which it is ordinarily subjected.

When the machine is to be employed for ginning cotton, I sometimes intend to employ a curved-wire grating, (indicated at *f*,) parallel with the main cylinder and just near enough to it to let the seeds pass. This grating, when used, will serve to roll the seeds over and over and effect a more complete separation between them and the cotton itself before both arrive at the beater.

The operation of the machine when rotary motion is communicated to the various cylinders is as follows: Cotton fiber intermixed with seed and dirt or trash, or wool having burrs, trash, or other foreign matter entangled in or mingled with it, is to be spread upon the endless apron. The apron will deliver it to the feeding-rollers and the latter will present it to the points of the teeth of the main cylinder. These latter will seize the fiber, drawing it away from the feeding-rollers; but as the periphery of the rollers moves much slower than the teeth of the main cylinder, these teeth will pull the matted and tangled fibers out piecemeal, thus partially separating and disentangling them from burrs and seed, &c. The burrs or seeds held in the grasp of the feed-rollers will, however, finally be pulled out attached to some of the fibers, and will, if large, ride upon the tops of the teeth, or if small will rest upon the cylindrical periphery of the interposed rings, or partly on both rings and teeth. The fiber entirely separated from burrs, seed, &c., will, on account of the draft or pull to which it was subjected when leaving the feed-rollers, be buried down below the tops of the teeth and lie on the surface of the pasteboard or other rings, protected by the tops of the teeth from any action of the beater. The fiber to which burrs, seeds, or trash still adhere will be partially buried and partially lie above the tops of the teeth. From this statement it will be perceived that a preliminary and very necessary partial separation of the refuse from the fiber will be effected by the action of the feeding-rollers and the main cylinder only. By the continued rotation of the main cylinder, the fibers and the burrs or refuse located on its periphery, as before described, will be carried along to the rotating beater, and its blades, as they sweep around, will complete the separation of the burrs, &c., from the fiber by striking against those that lie above the tops of the teeth and knocking them into the burr-box. As the beater revolves at great speed, it will also to some extent act as a blower, generating a current of air that will blow into the trash-receptacle minute particles of trash or seeds that may lie on the surface of the smooth or unnotched rings between the toothed rings. By the further rotation of the main cylinder, the cleansed fiber will be submitted to the action either of the rotating brushes, which will brush the fiber out of the teeth and discharge it by centrifugal force into any proper receptacle, or to the action of the wire teeth of the card-clothed cylinder of a carding machine or engine, which will comb the fiber out from among the teeth of the main cylinder.

I wish it to be distinctly understood that an ordinary card-clothed cylinder the teeth of which were made of strong wire stuck in leather, and were ground so that the tops thereof were concentric, has been used in connection with feeding-rollers and various sorts of beaters for cleansing burrs from wool, and also that I know that it has been proposed to remove burrs from wool by a machine patented by Milton D. Whipple, in which the cylinder was solid and vibrating, and the teeth were strong and cut out of the edge of a flat piece of metal, which formed a smooth continuous surface extending uninterruptedly lengthwise of the cylinder and common to many teeth, and level with the tops thereof, upon which burrs might rest, and from which it was proposed to scrape the burrs out of the wool by forcing the wool under a stationary guard. I claim neither of these, knowing them to be old; nor do I simply claim strong teeth, or concentric teeth, or teeth whose points are protected by the backs of preceding teeth; nor do I claim teeth in the general, projecting from a cylindrical surface; but,

Having thus described the whole apparatus, I claim therein as new and of my own invention—

1. A hollow cylinder having an outer acting surface composed of flat, strong, long-topped metallic teeth, combined with plain surfaces below the tops of the teeth, substantially as described, and capable of being used to produce the results specified.

2. In combination with a hollow cylinder provided with an acting or working surface substantially such as is described, feeding-rollers constructed and relatively arranged therewith substantially as set forth, the combination operating substantially as described, and these in combination with a rotating beater constructed, relatively arranged therewith, and operating substantially as hereinbefore set forth.

3. A rotating beater substantially such as is described, in combination with a hollow cylinder having an acting surface of teeth and cylindrical surface, substantially such as is specified, and in combination with these a burr-box or trash-box, and a rotating brush or its equivalent, or either of them, all the parts enumerated being substantially such as are hereinbefore set forth.

4. A hollow cylinder having substantially such an acting surface as is hereinbefore described, in combination with a rotating beater, as specified, and with a carding engine or machine, the combination acting substantially as set forth, and, in combination with these three elements or parts of a whole machine, feeding-rollers and a trash-box, substantially such as specified, by which combinations the cleansing preparatory to carding and the carding of wool are carried on jointly as a continuous process.

In testimony whereof I have hereunto subscribed my name.

S. R. PARKHURST.

In presence of—
M. B. ANDREWS,
MELVILLE V. BIGGS.